US005659400A

United States Patent [19]

Edakubo et al.

[11] Patent Number: 5,659,400

[45] Date of Patent: Aug. 19, 1997

[54] INFORMATION SIGNAL RECORDING DEVICE FOR RECORDING MAIN INFORMATION SIGNAL WITH INDEX SIGNAL FOR RAPIDLY AND ACCURATELY SEARCHING MAIN INFORMATION SIGNAL

[75] Inventors: Hiroo Edakubo; Kiyoshi Kumagai; Toshihiko Nakajima, all of Kanagawa-ken, Japan

[73] Assignee: Canon Kabushiki Kaisha, Tokyo, Japan

[21] Appl. No.: 430,886

[22] Filed: Apr. 28, 1995

Related U.S. Application Data

[63] Continuation of Ser. No. 134,467, Oct. 8, 1993, abandoned, which is a continuation of Ser. No. 781,990, Oct. 24, 1991, abandoned.

[51] Int. Cl.$^6$ .................................................. H04N 5/782

[52] U.S. Cl. ................................ 386/46; 360/18; 360/27; 360/72.2; 360/75; 386/65; 386/69; 386/95

[58] Field of Search .................................. 358/310, 323, 358/335, 341, 343; 360/18, 19.1, 27, 72.2, 73.08, 77.12, 77.13, 78.05, 33.1, 72.1, 75, 8, 9.1, 10.1, 10.3; H04N 5/76, 5/782

[56] References Cited

U.S. PATENT DOCUMENTS 4,587,577 5/1986 Tsunoda .................................. 360/18
4,636,879 1/1987 Narita et al. .......................... 360/72.2
4,772,960 9/1988 Takahashi et al. ...................... 360/18
4,799,111 1/1989 Ito .......................................... 360/18
4,956,725 9/1990 Kozuki et al. ......................... 358/335
5,194,997 3/1993 Kozuki et al. ......................... 360/72.2

*Primary Examiner*—Tommy P. Chin
*Assistant Examiner*—Khoi Truong
*Attorney, Agent, or Firm*—Robin, Blecker, Daley & Driscoll

[57] ABSTRACT

A signal recording apparatus is arranged to record main information in a first area provided in each of a multiplicity of parallel tracks formed on a tape-shaped recording medium, and an index signal in a second area of each of a predetermined number of continuous tracks, the second area being provided separately from the first area within each of the multiplicity of parallel tracks. The apparatus records, as the index signal, first index information in a first section within the second area of each of the predetermined number of continuous tracks, with either one of binary data being repeated continuously during a period corresponding to the first section, and second index information in a second section within the second area of each of the predetermined number of continuous tracks, the second index information including track data indicative of relation to a specific track among the predetermined number of continuous tracks. In the above-described arrangement, it is possible to increase the speed of search for a specific track by using the first index information and to improve the accuracy of search for the specific track by using the second index information.

7 Claims, 6 Drawing Sheets

| | | | | | | | |
|---|---|---|---|---|---|---|---|
| 3 | 3 | 2 | 2 | 0 | 0 | 0 | WD4 |
| 1 | 1 | 1 | 1 | 0 | 0 | 0 | WD3 |
| 2 | 1 | 1 | 0 | 1 | 1 | 0 | WD2 |
| 2 | 2 | 2 | 2 | 1 | 1 | 1 | WD1 |
| 20 | 20 | 20 | 20 | 20 | 20 | 20 | WD0 |
| 0 | 0 | 0 | 0 | 0 | 0 | 0 | HEADER |

MAGNETIC TAPE
DIRECTION OF TAPE TRAVEL
DIRECTION OF HEAD SCAN
221°
185°
36°
AV
AP
5°
180°
4.68°
26.32°
2.62°
2.06°
2.94°
VIDEO SIGNAL
PCM DATA
END-OF-SCAN AREA
GUARD AREA
POSTAMBLE
PREAMBLE
START-OF-SCAN AREA

| | | | | | | | |
|---|---|---|---|---|---|---|---|
| 3 | 3 | 2 | 2 | 0 | 0 | 0 | WD4 |
| 1 | 1 | 1 | 1 | 0 | 0 | 0 | WD3 |
| 2 | 1 | 1 | 0 | 1 | 1 | 0 | WD2 |
| 2 | 2 | 2 | 2 | 1 | 1 | 1 | WD1 |
| 20 | 20 | 20 | 20 | 20 | 20 | 20 | WD0 |
| 0 | 0 | 0 | 0 | 0 | 0 | 0 | HEADER |

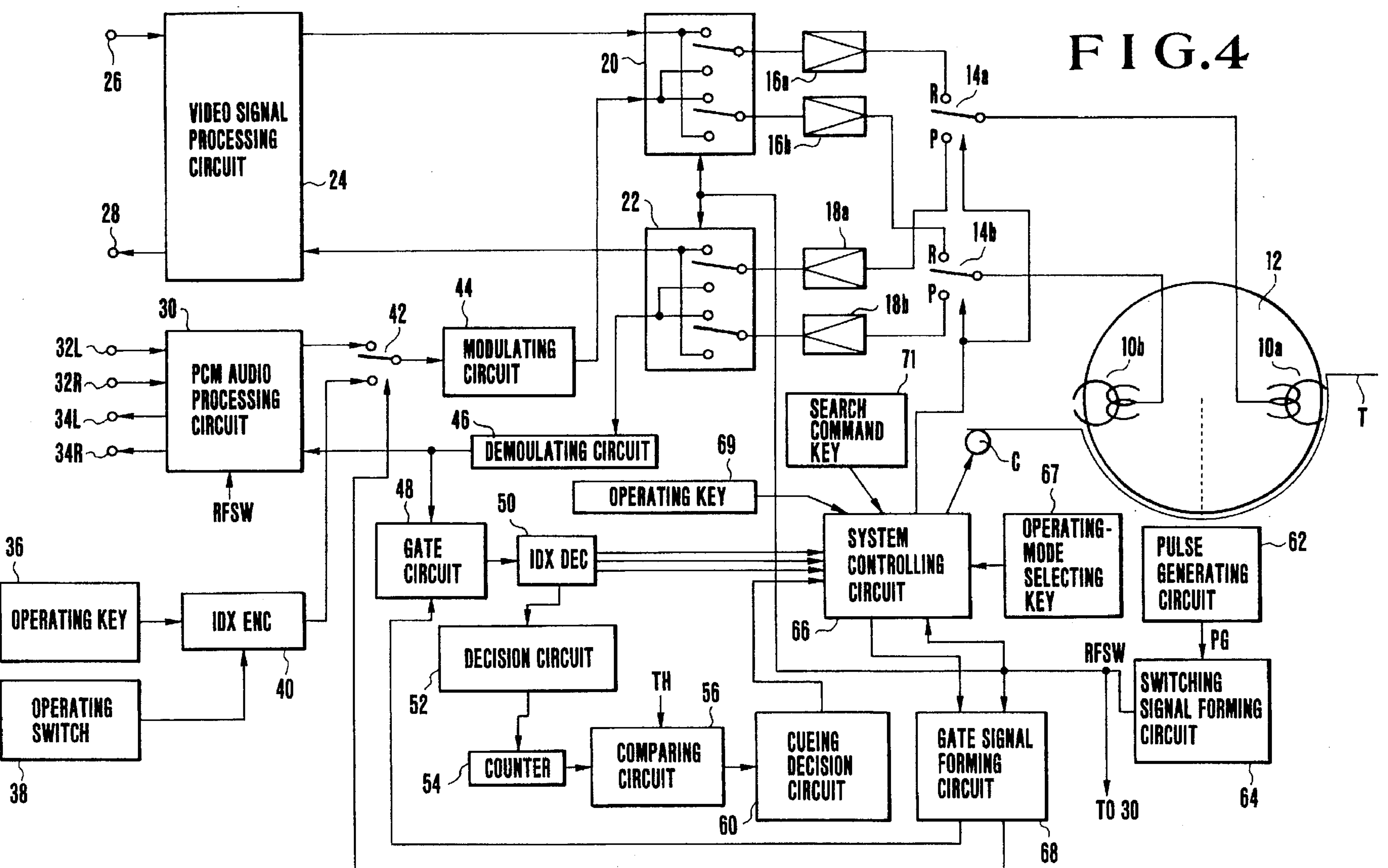
F I G.4
VIDEO SIGNAL PROCESSING CIRCUIT
PCM AUDIO PROCESSING CIRCUIT
MODULATING CIRCUIT
DEMOULATING CIRCUIT
GATE CIRCUIT
IDX DEC
IDX ENC
DECISION CIRCUIT
COUNTER
COMPARING CIRCUIT
CUEING DECISION CIRCUIT
OPERATING KEY
OPERATING SWITCH
SEARCH COMMAND KEY
OPERATING KEY
SYSTEM CONTROLLING CIRCUIT
OPERATING-MODE SELECTING KEY
GATE SIGNAL FORMING CIRCUIT
PULSE GENERATING CIRCUIT
SWITCHING SIGNAL FORMING CIRCUIT
PG
RFSW
RFSW
TO 30
TH
T
C
R
P
R
P
10a
10b
12
14a
14b
16a
16b
18a
18b
20
22
24
26
28
30
32L
32R
34L
34R
36
38
40
42
44
46
48
50
52
54
56
60
62
64
66
67
68
69
71

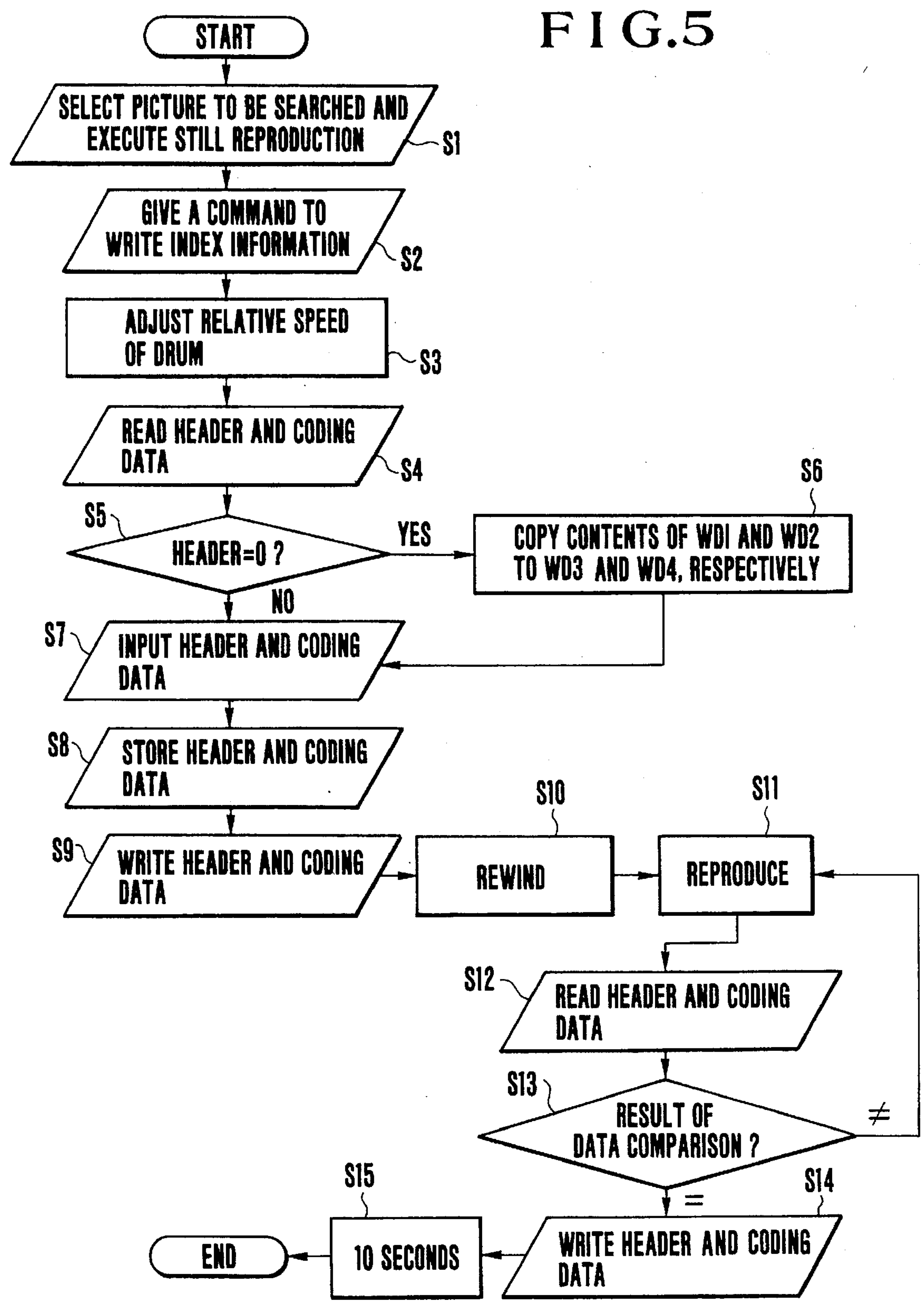

FIG.5
START
SELECT PICTURE TO BE SEARCHED AND EXECUTE STILL REPRODUCTION
S1
GIVE A COMMAND TO WRITE INDEX INFORMATION
S2
ADJUST RELATIVE SPEED OF DRUM
S3
READ HEADER AND CODING DATA
S4
S5
HEADER=0 ?
YES
NO
S6
COPY CONTENTS OF WD1 AND WD2 TO WD3 AND WD4, RESPECTIVELY
S7
INPUT HEADER AND CODING DATA
S8
STORE HEADER AND CODING DATA
S9
WRITE HEADER AND CODING DATA
S10
REWIND
S11
REPRODUCE
S12
READ HEADER AND CODING DATA
S13
RESULT OF DATA COMPARISON ?
≠
=
S14
WRITE HEADER AND CODING DATA
S15
10 SECONDS
END

START
INPUT INDEX NUMBER X
S20
S21
SEARCH COMMAND KEY ON ?
NO
YES
TRANSPORT TAPE AT HIGH SPEED
S22
S23
HEADER "0" ?
NO
YES
CAUSE TAPE TO TRAVEL AT NORMAL SPEED
S24
S25
WD1=X ?
YES
NO
S26
WD3=X ?
NO
YES
S27
REWIND TAPE
S28
REWIND TAPE
S29
WD4=0 ?
NO
YES
S30
WD2=0 ?
NO
YES
STOP TAPE
S31
END

INFORMATION SIGNAL RECORDING DEVICE FOR RECORDING MAIN INFORMATION SIGNAL WITH INDEX SIGNAL FOR RAPIDLY AND ACCURATELY SEARCHING MAIN INFORMATION SIGNAL

This is a continuation application under 37 CFR 1.62 of prior application Ser. No. 08/134,467, filed Oct. 8, 1993, now abandoned, which is a continuation of Ser. No. 07/781,990 filed Oct. 24, 1991 (abandoned).

BACKGROUND OF THE INVENTION

1. Field of the Invention

The present invention relates to a signal recording apparatus and, more particularly, to a signal recording apparatus arranged to record an index signal together with a main information signal by means of rotary heads.

2. Description of the Related Art

A video tape recorder (VTR) based on a so-called 8 mm video system is known as one rotary-head helical scan type of recording and reproducing apparatus. In such an 8 mm VTR, two magnetic heads having different azimuth angles are spaced apart through 180° around the circumferential surface of a rotary drum, and a magnetic tape is slantwise scanned alternately by the magnetic heads so that video signals are recorded in sequence.

FIG. 1 shows a recording format of the 8 mm video system. A PCM audio signal recording area AP is formed over 36° from the leading end of a track at which either of the magnetic heads comes in abutment with the magnetic tape, and a video signal recording area AP is formed over the next 185° . The initial 5° of the PCM audio signal recording area AP is a portion in which the magnetic head starts track scanning. The first 2.94° of this portion is a start-of-scan area and the second 2.06° (equivalent to 3H; 1H is one horizontal scanning period) is a preamble for clock run-in to establish synchronization with the succeeding PCM data. After the preamble, a recording area for PCM data on a time-base compressed audio signal is formed over 26.32°. Then, a postamble serving as a back margin for the offset of a recording position or the like during postrecording is formed over 2.06° (3H), and a guard area is formed over 2.62°. Following the guard area, a recording area for one field of video signals is formed over 180°, and then an end-of-scan area is formed over 5°.

One field of audio data and index data including time information, cueing information, etc., on the audio data is time-base-multiplexed so that these data are recorded in the PCM data area with the index data mixed with the audio data. The index data include various data such as the year, month and day of recording, an absolute address, a program number, time information (a so-called time code) and cueing information, and is used for cueing or editing during reproduction.

However, since the index data is interleaved with the audio data and recorded in coded form, it is impossible to take out the index data before the PCM data is de-interleaved and decoded. Accordingly, there has conventionally been the problem that a long processing time is taken until the index data become available for cueing or editing. An additional problem is that, during search reproduction, it is difficult to reproduce the index data correctly since recording tracks are scanned slantwise by the rotary heads.

To cope with the above-described problems, a method has been proposed in which index data having contents similar to the index data contained in the PCM data are recorded in the postamble area of the PCM audio signal recording area AP.

FIG. 2 shows the index format of the postamble area in this method. As shown in Part (a) of FIG. 2, the postamble area following the PCM data area is assigned 2.65H, and the succeeding 1.5H is assigned to an index area. The guard area is assigned 2.65H.

As shown in Part (b) of FIG. 2, in the index area of 1.5H, the first 1.26H is a header area and the second 0.24H is a coding-data area. If an index signal is recorded in this index area, "0" is written to the header area repeatedly and continuously. If an index signal is not recorded or has been erased, "1" is written repeatedly and continuously. The coding-data area is divided into eight blocks as shown in Part (c) of FIG. 2. A code start marker is placed in the first block, an 8 bit ID code in each of the succeeding five blocks, a CRC code for error detection in the next block, and a code end marker in the last block.

The above-described method has the advantage that since the index data are recorded in an area different from the PCM data area, only the index data can be independently recorded in a recorded track at a later time.

However, in the aforesaid index format, to realize an accurate picture search, for example, on a picture-by-picture basis, captures, frame numbers and the like must be continuously recorded from the leading edge of a tape over the coding-data areas of individual index areas. In addition, since it is necessary that "0" in the header can be reliably reproduced during search reproduction, "0" must be recorded in each track continuously over at least a predetermined area, and continuously for a predetermined time or more (for example, 10 seconds). A fine search is, therefore, impossible.

SUMMARY OF THE INVENTION

It is, therefore, an object of the present invention to solve the above-described problems.

Another object of the present invention is to provide a signal recording apparatus capable of recording an index signal so that a search can be performed reliably and rapidly on a track-by-track basis.

To achieve the above objects, according to one aspect of the present invention, there is provided a signal recording apparatus which comprises first recording means for recording main information in a first area provided in each of a multiplicity of parallel tracks formed on a tape-shaped recording medium, and second recording means for recording an index signal in a second area of each of a predetermined number of continuous tracks, the second area being provided separately from the first area within each of the multiplicity of parallel tracks. The second recording means includes first means for generating first index information which is to be recorded in a first section within the second area of each of the predetermined number of continuous tracks and which has either one of binary data repeated continuously during a period corresponding to the first section, and second means for generating second index information which is to be recorded in a second section within the second area of each of the predetermined number of continuous tracks and which includes track data indicative of relation to a specific track among the predetermined number of continuous tracks.

Another object of the present invention is to provide a signal recording apparatus capable of recording an index signal so that temporally close pieces of main information can be distinguished and accessed rapidly.

To achieve the above object, according to another aspect of the present invention, there is provided a signal recording apparatus which comprises first recording means for recording main information in a first area provided in each of a multiplicity of parallel tracks formed on a tape-shaped recording medium, and second recording means for recording an index signal in a second area of each of a predetermined number of continuous tracks, the second area being provided separately from the first area within each of the multiplicity of parallel tracks. The second recording means includes first means for generating first index information which is to be recorded in a first section within the second area of each of the predetermined number of continuous tracks and which has either one of binary data repeated continuously during a period corresponding to the first section, and second means for generating second index information which is to be recorded in a second section within the second area of each of the predetermined number of continuous tracks and which includes first data related to a first specific track among the predetermined number of continuous tracks and second data related to a second specific track among the predetermined number of continuous tracks.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 4 is a block diagram diagrammatically showing the construction of the VTR according to the embodiment of the present invention;

FIG. 5 is a flowchart which serves to illustrate the operation of writing an index signal in the VTR of FIG. 4.

DETAILED DESCRIPTION OF THE PREFERRED EMBODIMENT

A preferred embodiment of the present invention will be described below with reference to the accompanying drawings.

Figure 3:
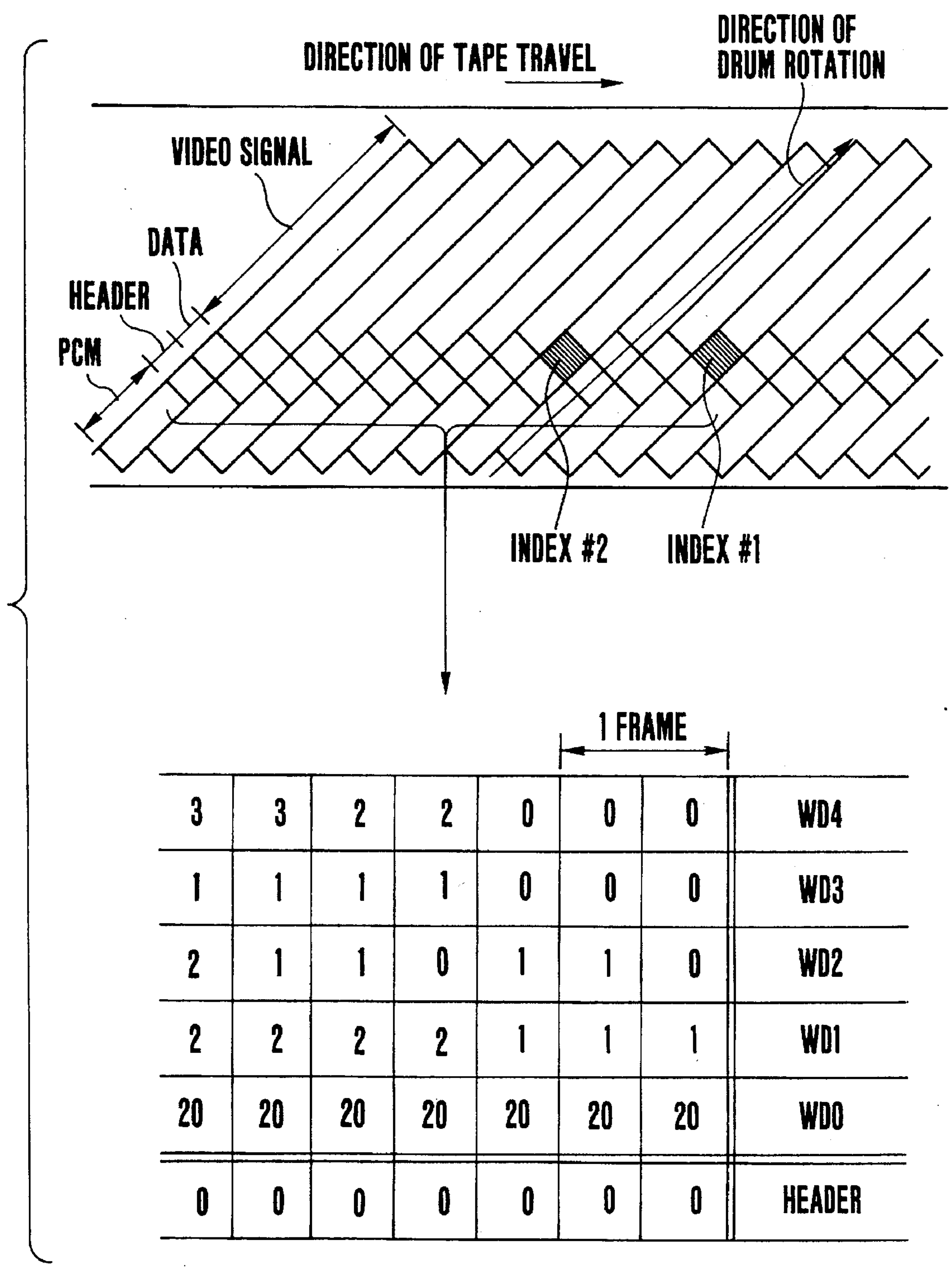
FIG. 3 is a view which serves to illustrate the contents of an index signal recorded in a VTR according to one embodiment of the present invention.

FIG. 3 shows signal examples recorded in individual index areas according to the preferred embodiment of the present invention. "1" is normally recorded in the header of each index area, but "0" is recorded as a cueing index in the header of each of fields which are formed continuously between a desired field to be searched and a field which is formed ten seconds after the scan of the desired field. In the present embodiment, five blocks WD0, WD1, WD2, WD3 and WD4 for the coding data are defined as follows. The block WD0 indicates the mode of the corresponding track. For example, if a search mode is represented by "20", this indicates that a search is executed with respect to only tracks each including an index area having the block WD0 in which "20" is written.

The block WD1 indicates an index number for search, which is arbitrarily defined. This index number is inputted from an operating key such as a ten-key pad, as will be described later, to designate a desired specific field to be searched. The index number is recorded over the index areas each having the header in which "0" is written. Such an index number is used when the desired specific field is to be searched.

The block WD2 indicates the number of frames present from a track in which the desired specific field to be searched is recorded up to the track associated with the block WD2. On the basis of the block WD2, it is possible to find the number of frames (or the number of tracks) from each of the tracks in which the index numbers for search are recorded up to the desired specific field to be searched.

The block WD3 is a block in which, if an additional specific field to be searched is present, that is, two index numbers overlap, during the period in which tracks with "0" written in their respective headers appear continuously, one defined index number which precedes the other is recorded. If there is no defined index number which precedes the other, "0" is recorded in the block WD3; otherwise, the precedent defined index number is recorded in it.

The block WD4 is a block which, if an additional specific field to be searched is present during the period in which tracks with "0" written in their respective headers appear continuously, indicates the number of frames up to the corresponding track from a specific field which is assigned one defined index number which precedes the other. The provision of the block WD4 makes it possible to prevent a previously recorded index number from being erased by an index number which is defined later.

FIG. 4 is a block diagram showing the construction of the present embodiment. The arrangement shown in FIG. 4 includes rotary heads 10*a* and 10*b* which are mounted on a rotary drum 12 with a phase difference of 180°, selecting switches 14*a* and 14*b* which are respectively connected to contacts R during recording and to contacts P during reproduction, recording amplifiers 16*a* and 16*b* reproducing amplifiers 18*a* and 18*b*, a head selecting switch 20 for selecting the head 10*a* or 10*b* during recording, a head selecting switch 22 for selecting the head 10*a* or 10*b* during reproduction, and a video signal processing circuit 24. During recording, the video signal processing circuit 24 applies recording processing to a video signal inputted from an input terminal 26 and supplies the result to the switch 20. During reproduction, the video signal processing circuit 24 applies reproduction processing to a reproduced signal inputted from the head selecting switch 22 and outputs the result to an output terminal 28.

The shown arrangement also includes a PCM audio processing circuit 30 for pulse-code modulating right- and left-channel audio signals inputted from input terminals 32R and 32L and outputting the PCM data, and for demodulating reproduced PCM data and outputting the resultant right- and left-channel reproduced audio signals to output terminals 34R and 34L, an operating key 36 which is operated to input a desired mode and an index number in index information, an operating switch 38 which is operated to give a write command to perform writing to an index area so that the code of the header of the aforesaid index area is set to "0", and an index encoder 40 for forming coding data WD0 to WD4 corresponding to the operation of the operating switch 38 and index information inputted from the operating key 36. For example, if the operating switch 38 is turned on or off for the purpose of cueing and a signal indicative of the ON or OFF switching of the operating switch 38 is inputted to the index encoder 40, the index encoder 40 outputs signals which include a header containing "0" and the coding data WD0 to WD4 each containing the above-described contents, for the purpose of writing to a predetermined number of tracks. The shown arrangement also includes a switch 42 for selecting the output of the index encoder 40 while the heads 10*a* and 10*b* are tracing the index area of FIG. 2, and a recording modulating circuit 44.

Figure 2:
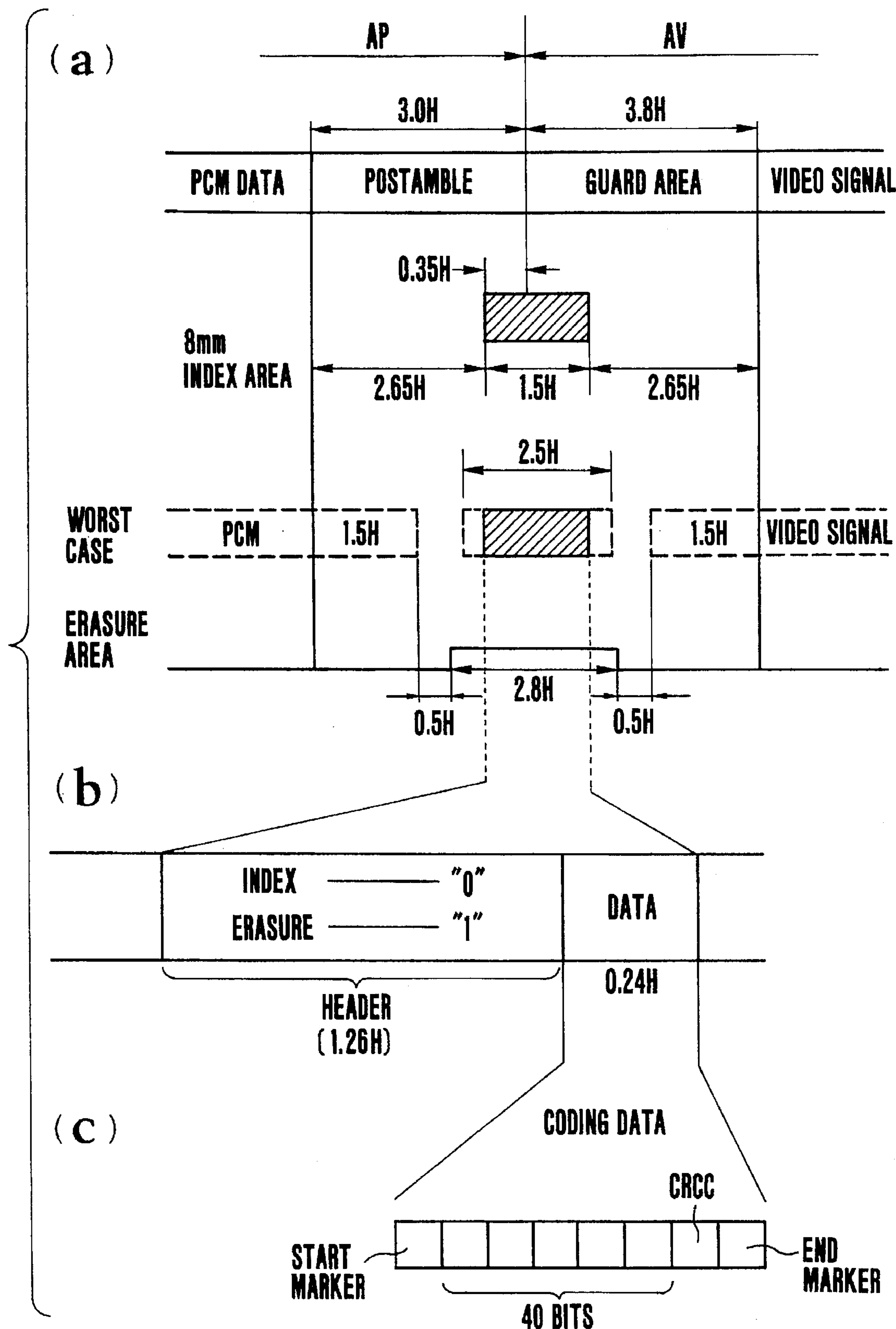
FIG 2 (a–c) are views showing examples of the recording format of an index signal in the format shown in FIG. 1.

The shown arrangement also includes a demodulating circuit 46 for demodulating a reproduced signal supplied from the switch 22 into a binary value of "0" or "1", a gate circuit 48 for taking out the reproduced signal obtained from the index area of FIG. 2, from the output of the demodulating circuit 46, an index decoder 50 for outputting the header to a "0" decision circuit 52 which will be described later and for outputting the coding data WD0 to WD4 to a system controlling circuit 66 which will be described later, the "0" decision circuit 52 for making a decision as to whether the header from the index decoder 50 contains "0", a counter 54 for counting the number of decision results obtained by making a decision as to each bit, a comparing circuit 56 for comparing the count of the counter 54 with a predetermined threshold TH, and a cueing decision circuit 60 for determining whether a cueing position has been reached, according to the comparison result provided by the comparing circuit 56.

The shown arrangement also includes a pulse generating circuit 62 for generating a PG pulse indicative of the rotational phase of the rotary drum 12, a switching-signal forming circuit 64 for generating a switching control signal RFSW according to the PG pulse generated from the pulse generating circuit 62, the system controlling circuit 66 for controlling the entire apparatus, and a gate signal forming circuit 68 for generating a gate signal for the gate circuit 48 at a timing synchronized with the switching control signal RFSW, under the control of the system controlling circuit 66. The switches 20 and 22 are each switched in accordance with the switching control signal RFSW. The switching control signal RFSW is also supplied to the system controlling circuit 66 and to the PCM audio processing circuit 30.

Figure 1:
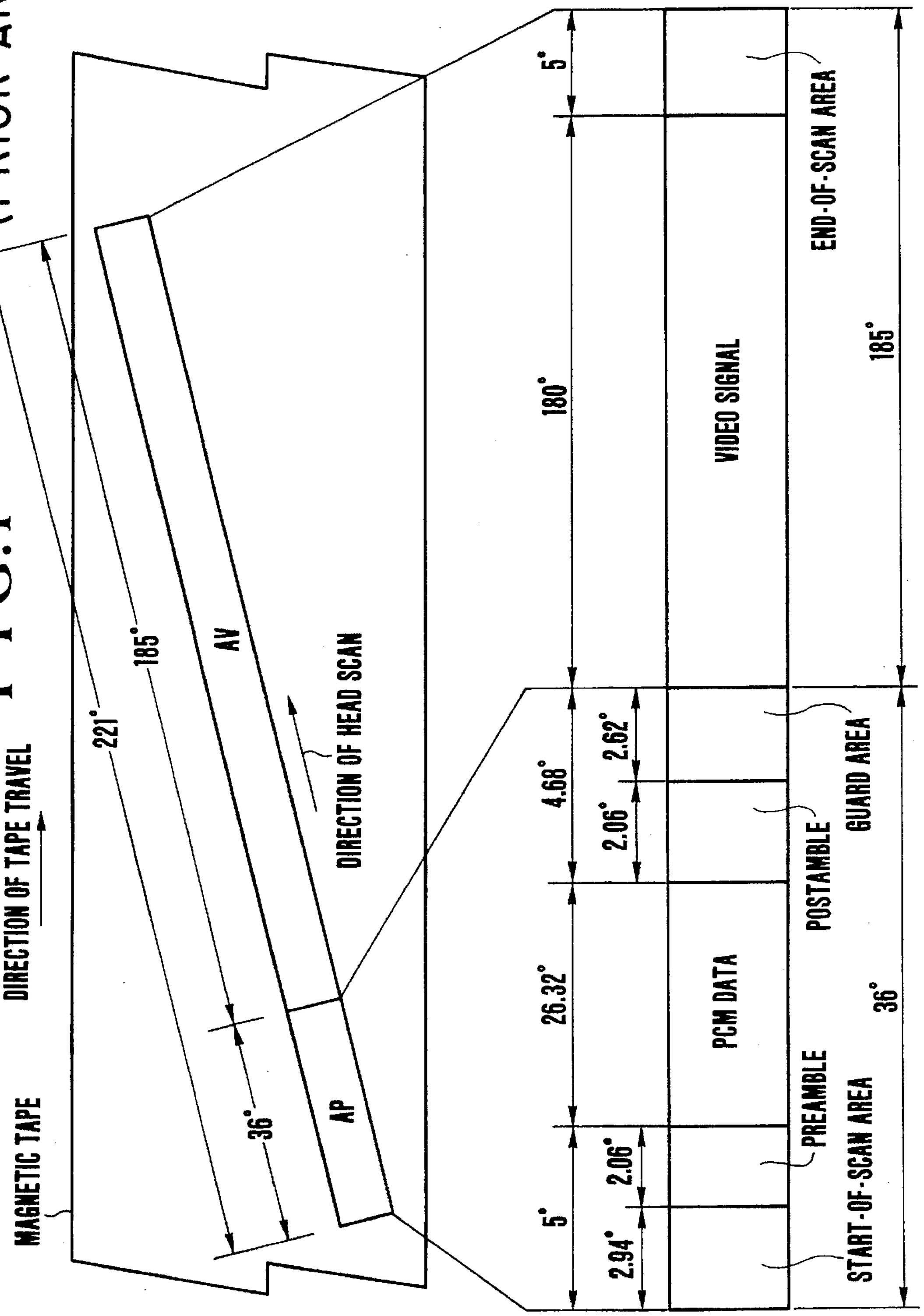
FIG. 1 is a view which serves to illustrate a recording format adopted in a known VTR.

A basic operation for recording will be described below. Each of the switches 14*a* and 14*b* is connected to the contact R in accordance with a control signal from the system controlling circuit 66. The video signal processing circuit 24 applies video processing to a video signal inputted from the input terminal 26 and outputs the result to the switch 20. The PCM audio processing circuit 30 converts audio signals inputted from the input terminals 32L and 32R into PCM data, and outputs the PCM data at a timing corresponding to the period during which the heads 10*a* and 10*b* trace the PCM data of FIG. 1, in accordance with the switching control signal RFSW. The index encoder 40 forms an index signal as described above, according to the operations of the operating switch 38 and the operating key 36. The switch 42 is normally connected to the output side of the PCM audio processing circuit 30, but is connected to the output side of the index encoder 40 during the scan of the index area which is placed between the postamble and guard area of the PCM signal recording area AP (refer to FIG. 2). The modulating circuit 44 modulates the data inputted from the switch 42 into a signal of 5.8 MHz for "1" or into a signal of 2.9 MHz for "0", and outputs the result to the switch 20.

The switch 20 switches the heads 10*a* and 10*b* therebetween at intervals of a ½ rotation of the drum 12, according to the switching control signal RFSW. The switch 20 is also switched so that, during the scan of the same track, the output of the modulating circuit 44 is selected with respect to the area AP, while the output of the video signal processing circuit 24 is selected with respect to the area AP. The output of the switch 20 is amplified by the recording amplifier 16*a* or 16*b* and is then applied to the head 10*a* or 10*b* through the switch 14*a* or 14*b*, so that the output is recorded on a magnetic tape T.

A bask operation for reproduction will be described below.

During reproduction, the switches 14*a* and 14*b* are connected to the respective contacts P. The reproduced outputs of the heads 10*a* and 10*b* are respectively supplied to the switch 22 through the switch 14*a* and the reproducing amplifier 18*a* and through the switch 14*b* and the reproducing amplifier 18*b*. The switch 22 is switched in a manner similar to that of the switch 20, according to the switching control signal RFSW from the switching signal forming circuit 64, so that the reproduced signal from the area AV is supplied to the video signal processing circuit 24 and the reproduced signal from the area AP to the demodulating circuit 46. The video signal processing circuit 24 applies reproduction processing to the signal from the switch 22, and outputs the resultant reproduced video signal to the output terminal 28. The demodulating circuit 46 demodulates a biphase mark signal into PCM data. The output of the demodulating circuit 46 is applied to the PCM audio processing circuit 30 and to the gate circuit 48.

The PCM audio processing circuit 30 performs error detection and error correction of the reproduced data and then restores right- and left-channel analog audio signals and outputs them to the output terminals 34R and 34L.

The gate circuit 48 extracts index data which are inserted between the postamble and the guard area and supplies it to the index decoder 50, in accordance with a gate signal from the gate signal forming circuit 68. The index decoder 50 decodes the obtained coding data and supplies the result to the system controlling circuit 66, and supplies the header to the "0" decision circuit 52. The "0" decision circuit 52 makes a decision as to whether the content of each bit of the header is "0" or "1". If the decision result is "0", the counter 54 counts up and the comparing circuit 56 compares the result of the counting of the counter 54 with the predetermined threshold TH. If the count of the counter 54 is greater than or equal to the predetermined threshold TH, it is determined that a cueing position has been reached. The cueing decision circuit 60 outputs a corresponding decision result signal to the system controlling circuit 66. The system controlling circuit 66 outputs, for example, a tape-travel stop control signal in accordance with the output of the decision circuit 60.

In the above-described manner, it is possible to control the entire apparatus by using the index signal recorded between the postamble and the guard area.

FIG. 5 is a flowchart showing the operation of the apparatus when an index signal is to be recorded between the postamble and the guard area. First of all, normal reproduction or slow reproduction is initiated by operating an operating-mode selecting key 67 and a specific picture to be searched later is selected, and then the magnetic tape T is stopped by a capstan C to set the state of still reproduction (S1). When writing of index information with respect to the presently still-reproduced picture selected as the specific picture is ordered by the operation of the operating switch 38 (S2), the rotational speed of the rotary heads is made to coincide with the relative speed between the rotary heads and the magnetic tape T (S3). During this state, the index signal (header and coding data) between the postamble and the guard area is read (S4).

If the reproduced header contains "1" (S5), the header is set to "0" , the block WD0 to a desired mode number ("20" in the present embodiment), the block WD1 to the index number inputted through the operating key 36, the block WD2 to "0", and each of the blocks WD3 and WD4 to "0". These signals are stored in a memory within the system controlling circuit 66 and also written to the same track on the magnetic tape T (S7, S8 and S9). Then, the magnetic tape T is rewound by a small amount by means of the capstan C (S10), and a reproducing mode is selected (S11). The index signal between the postamble and the guard area of each track is reproduced and the obtained header and coding data are read (S12). The header and the coding data are respectively compared with the header and coding data stored in the memory in Step S8 (S13). Then, signals which include the header with "0", the block WD0 with "20", the block WD1 with the aforesaid index number, and the block WD2 with the number of frames counted from a track in which "0" is written, are recorded in the index area, shown in Part (a) of FIG. 2, of each of the tracks which are formed continuously for ten seconds after the scan of a track which has provided an equal comparison (S14 and S15).

If the header of the index signal of the still-reproduced field signal is "0" (S5), the contents of the blocks WD1 and WD2 read in Step S4 are copied to the blocks WD3 and WD4, respectively. The header is set to "0", the block WD0 to "20", the block WD1 to an index number different from the aforesaid index number, and the block WD2 to "0", and these signals are stored in the memory of the system controlling circuit 66 and also written to the same track on the magnetic tape T (S7, S8 and S9). Then, the magnetic tape T is rewound (S10), reproduced (S11 and S12), and a data comparison is performed (S13). Then, signals, which include the header with "0", the block WD0 with "20", the block WD1 with the aforesaid different index number, and the block WD2 with the number of frames counted from the track of Step 9 up to the corresponding track, the block WD3 with the precedent recorded index number, the block WD4 with the number of frames up to the corresponding track from the first track that records the index number recorded in the block WD3, are recorded in the index area, shown in Part (a) of FIG. 2, of each of the tracks which are formed continuously for ten seconds after the scan of a track which has provided an equal comparison (S14 and S15).

Figure 6:
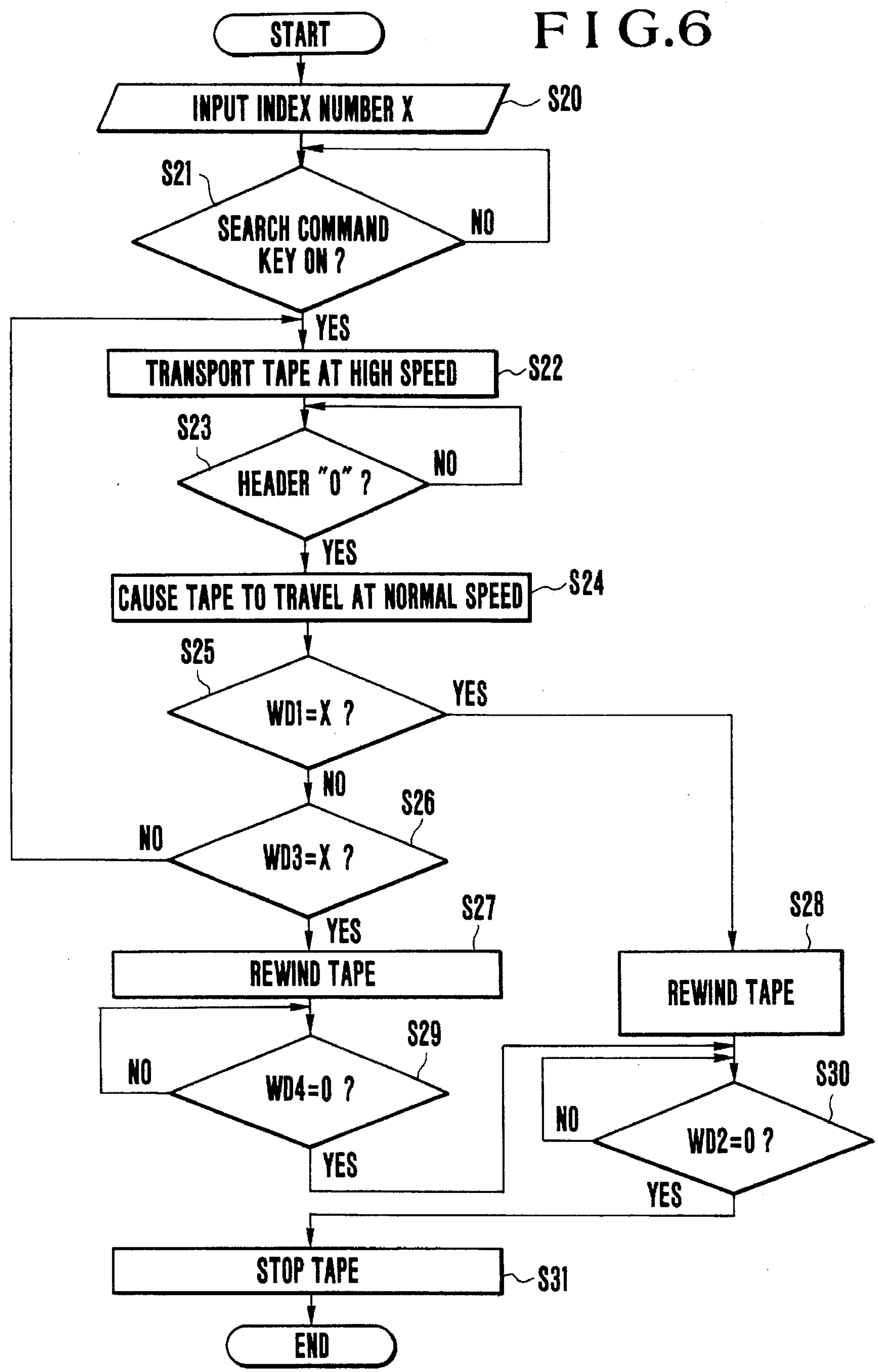
FIG. 6 is a flowchart which serves to illustrate the operation of performing a search in the VTR of FIG. 4.

A search operation using the index signal recorded in the above-described manner will be described below with reference to the flowchart of FIG. 6.

First of all, a desired index number X to be searched is inputted through an operating key 69 (S20). During this state, when a search command is inputted through a search command key 71 (S21), the system controlling circuit 61 controls the capstan C to transport the magnetic tape T at a high speed (S22).

During this state, if the period during which headers with "0" continue is identified by means of the cueing decision circuit 60 (S23), the system controlling circuit 61 shifts the travel speed of the magnetic tape T to a normal speed and performs reproduction of the coding data WD0 to WD4 (S24).

If the block WD1 contains the desired index number X (S25), the magnetic tape T is rewound at a low speed (S28) and it is detected whether the block WD2 is "0" (S30). If it is detected that the block WD2 is "0", the magnetic tape T is made to stop (S31). If the block WD1 does not contain the desired index number X (S25), it is detected whether the block WD3 contains the desired index number X (S26). If it is detected that the block WD3 contains the desired index number X, the magnetic tape T is rewound at a low speed (S27) and it is detected whether the block WD4 is "0" (S29). If it is detected that the block WD4 is "0", it is detected whether the block WD2 is "0" (S30) and the magnetic tape T is made to stop (S31).

As is apparent from the foregoing description, in the VTR according to the present embodiment, it is possible to detect reliably and accurately a track in which a desired picture is recorded.

In addition, even if a plurality of pictures to be searched are recorded close to each other, it is similarly possible to search rapidly a track in which a desired picture is recorded.

What is claimed is:

1. An information recording method, comprising:

(a) a main information recording step of recording main information by tracing with a recording head a first area disposed on each of a multiplicity of parallel tracks, each of which is disposed in parallel to each other, formed on a tape-shaped recording medium; and (b) an index information recording step of being a step to record index information which is used when a search is performed in succession by tracing a second area which is arranged to be disposed on a tracing path of the recording head on the tape-shaped recording medium and to be adjacent to the first area, when a designation is given to record the index information, said index information recording step being arranged to record repeatedly on a first section of the second area of each of a predetermined number of tracks in sequence among said multiplicity of parallel tracks first index information data indicative of a state that the index information is recorded, record second index information data indicative of a searching index number on a second section of the second area different from the first section, and record, further on a third section which is different from the first section and the second section, third index information data indicative of a relative positional relationship of a track on which second index information data indicative of a specific searching index number is recorded, said track being one of all of the tracks on which the second index information data is recorded, with respect to the track on which the recording is being made.

2. A method according to claim 1, wherein the main information includes a video signal.

3. A method according to claim 1, wherein said second index information data includes numerical data indicative of a numerical value which is set as said searching index number.

4. A method according to claim 3, further comprising a manual operation step of inputting the numerical data according to the intention of an operator.

5. A method according to claim 1, wherein the third index information data includes track data indicative of a relative track number of the track on which the second index information data indicative of the specific searching index number is recorded, said track being the one of all of the tracks on which the second index information data is recorded, with respect to the track on which the recording is being made.

6. An information recording method, comprising:

(a) a main information recording step of recording main information by tracing with a recording head a first area disposed on each of a multiplicity of parallel tracks, each of which is disposed in parallel to each other, formed on a tape-shaped recording medium; and (b) an index information recording step of being a step to record index information which is used when a search is performed in succession by tracing a second area which is arranged to be disposed on a tracing path of the recording head on the tape-shaped recording medium and to be adjacent to the first area, when a designation is given to record the index information, said index information recording step being arranged to record, during merely a period of time corresponding to said first section, on a first section of the second area of each of a predetermined number of tracks in sequence among said multiplicity of parallel tracks first index information data in which one of two-valued data indicative of a state that the index information is recorded is continuously repeated, record second index information data indicative of a searching index number on a second section different from the first section, and record, further, on a third section which is different from the first section and the second section, third index information data indicative of a relationship between a track on which the second index information data indicative of a specific searching index number is recorded, said track being one of all of the tracks on which the second index information data is recorded, and the track on which the recording is being made.

7. A method according to claim 6, wherein said second index information data includes first data indicative of an intrinsic numerical value as a searching index number, and said third index information data includes second data indicative of a numerical value corresponding to a relative positional relationship of the track on which the second index information data indicative of the specific searching index number is recorded, said track being the one of all of the tracks on which the second index information data is recorded, with respect to the track on which the recording is being made.

* * * * *

UNITED STATES PATENT AND TRADEMARK OFFICE

CERTIFICATE OF CORRECTION

PATENT NO. : 5,659,400

DATED : August 19, 1997

INVENTOR(S) : Edakubo et al.

It is certified that error appears in the above-identified patent and that said Letters Patent is hereby corrected as shown below:

Col. 6, line 8, delete "bask" and insert -- basic --.

Signed and Sealed this

Seventeenth Day of March, 1998

Attest:

BRUCE LEHMAN

*Attesting Officer* *Commissioner of Patents and Trademarks*